May 7, 1957  G. WUERTHNER  2,791,436
COLLAPSIBLE GOLF CART
Filed Nov. 22, 1954  4 Sheets-Sheet 4
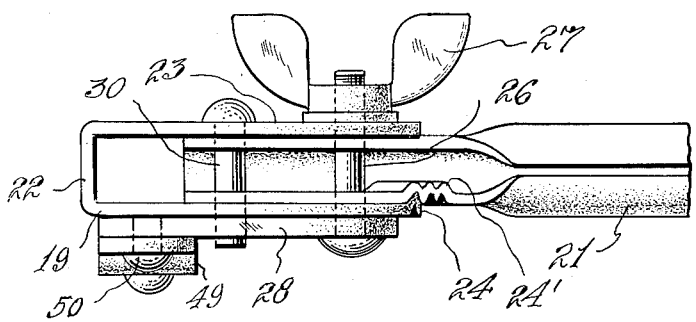
Fig. 9
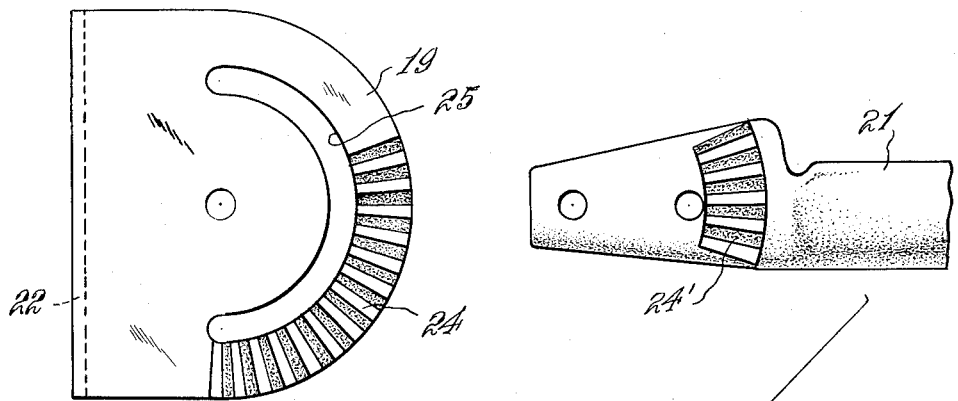
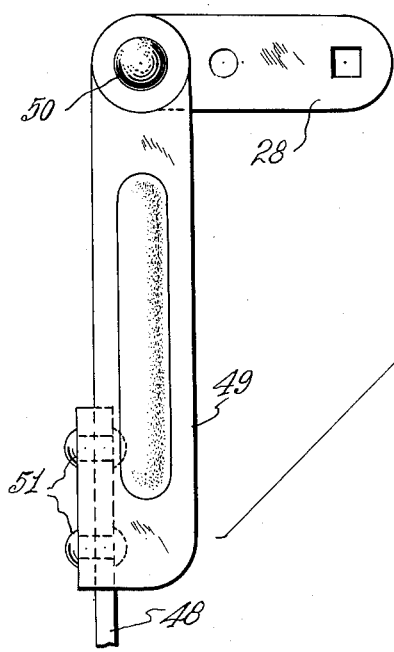
Fig. 10
Inventor:
George Wuerthner
By Rudolph Hurick
Attorney.

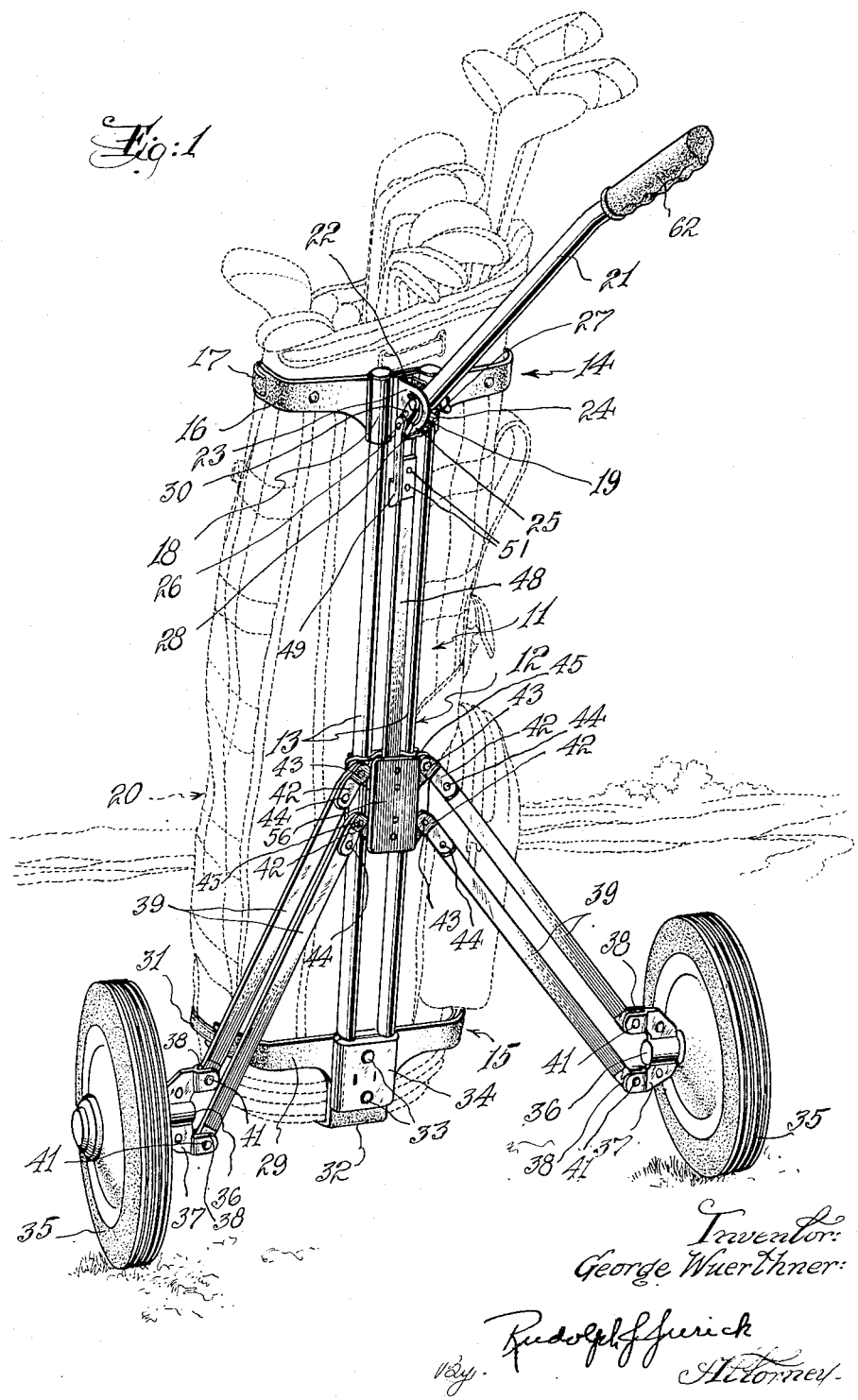

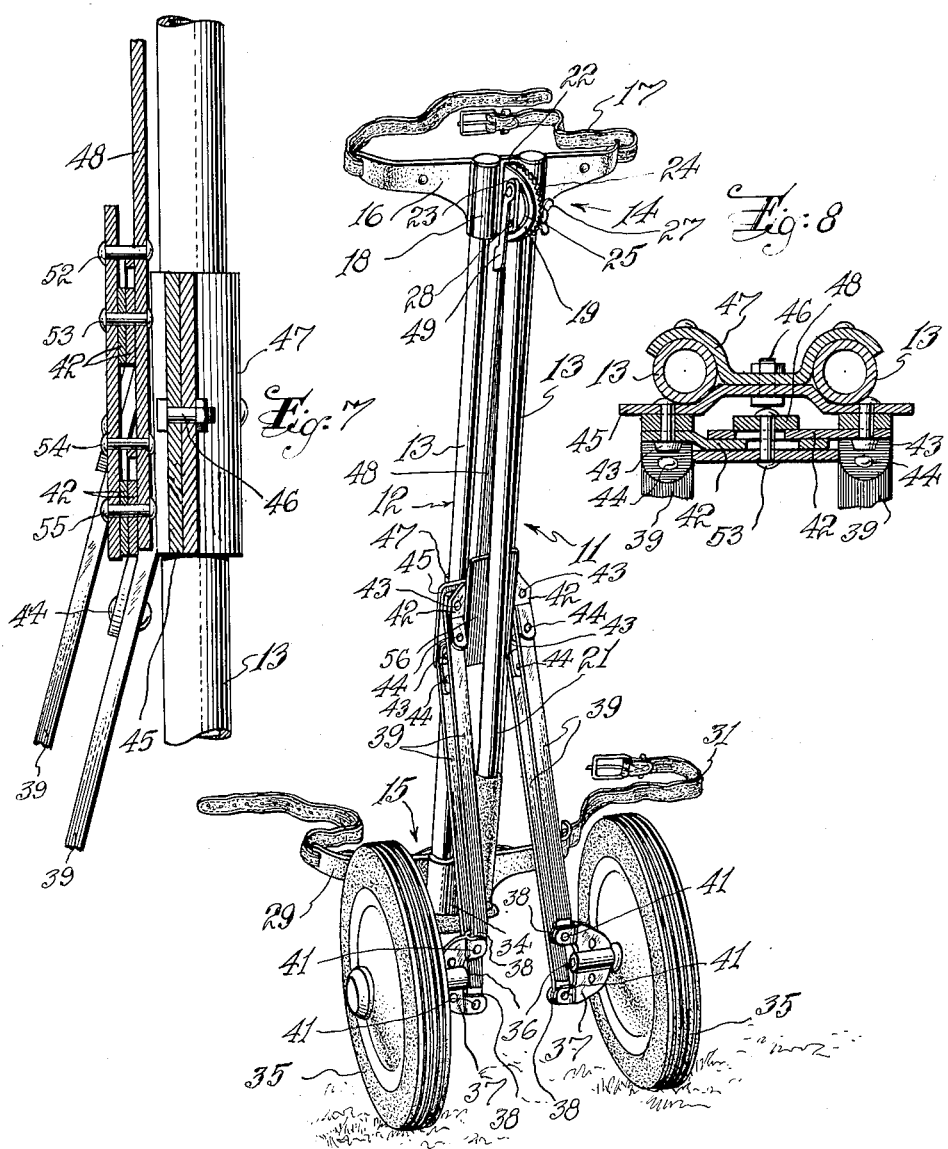

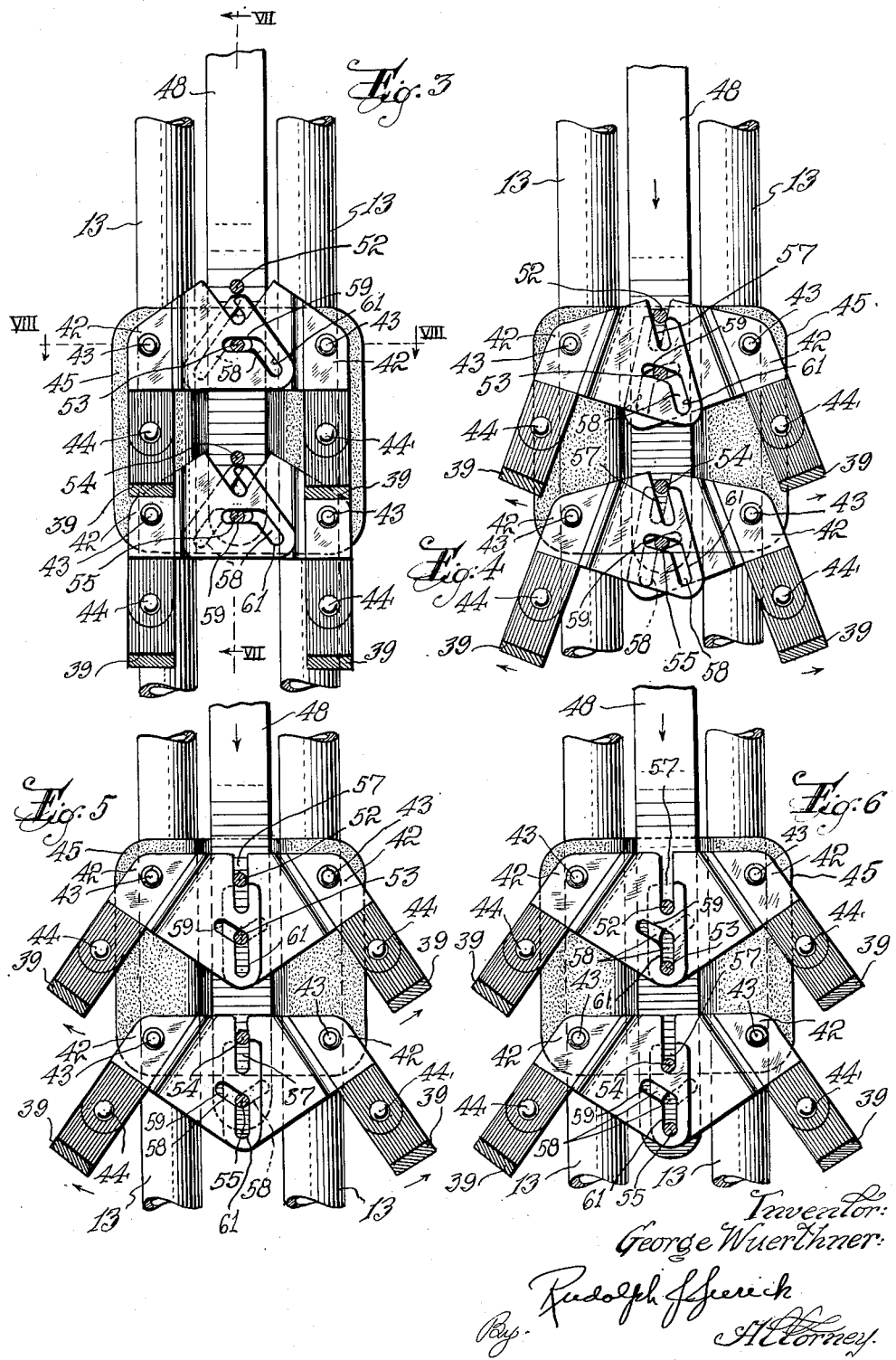

United States Patent Office 2,791,436
Patented May 7, 1957

2,791,436
COLLAPSIBLE GOLF CART
George Wuerthner, Elizabeth, N. J.
Application November 22, 1954, Serial No. 470,295
7 Claims. (Cl. 280—38)

This invention relates to an improved cart or carriage, primarily adapted for carrying a bag of golf clubs around a golf course, but which is also capable of other transporting uses.

Carts of this general type have been previously developed, but lack the adaptability of the device of my invention. Such a device embodying my invention may be set up, adjusted for different heights of users, or moved to collapsed position, by one continuous movement of a handle.

An object of the invention is to provide for synchronized opening and closing of the cart wheels, that is, setting up and adjusting, as well as collapsing of the device, all as a single operation.

An object of the invention is to provide a cart for transporting golf clubs and the like, provided with an adjustable clock so that the handle can easily be set in desired position, said clock being provided with corrugations meshable with a corresponding portion of the handle so as to hold the latter fixedly in a desired position by means of a simple, finger-operable clamping members.

An object of the invention is to provide a golf cart in which the wheels thereof may be moved between separated or set-up position to close-spaced or collapsed position, while maintaining their parallel relationship, thereby adapting the cart to be rolled even while collapsed.

An object of the invention is to provide a golf cart on which each wheel is individually mounted to insure flexibility and gliding ease over any type of terrain.

An object of the invention is to provide a collapsible golf cart, light in weight yet sturdily constructed, and having a bag-embracing head and a bag-supporting foot, each of which receives a strap for securing a golf bag thereto and including a novel, simple mechanism for collapsing and unfolding the wheel-supporting elements.

These and other objects and advantages of the invention will become apparent from the following specification when taken with the accompanying drawings. It will be understood the drawings are for purposes of illustration and are not to be construed as defining the scope or limits of the invention, reference being had for the latter purpose to the claims appended hereto.

In the drawings, wherein like reference characters denote like parts in the several views:

Figure 1 is a perspective view of a collapsible golf cart in the open, unfolded, or set-up position, and embodying my invention, a bag of golf clubs being illustrated as supported in normal position thereon;

Figure 2 is a view similar to Figure 1, but illustrating the cart with the golf bag removed and in the closed, folded or collapsed position;

Figure 3 is a fragmentary front view of the setting-up and collapsing mechanism for the wheels with the cover plate removed, the parts being illustrated in the folded or collapsed position;

Figure 4 is a view corresponding to Figure 3, but showing the positions of the parts at the start of the opening or unfolding operation;

Figure 5 is a view corresponding to Figure 4, but showing a subsequent position in which the cart is fully opened and at the beginning of the idle movement or that where height adjustment of the operating handle is effected, the handle then being in its lowest normal position;

Figure 6 is a view corresponding to Figure 5, but showing the parts at the end of the idle movement, wherein the handle would be disposed in uppermost or highest normal position;

Figure 7 is a vertical sectional view on the line VII—VII of Figure 3, in the direction of the arrows;

Figure 8 is a transverse sectional view on the line VIII—VIII of Figure 3, and perpendicular to the axes of the frame columns or posts, in the direction of the arrows;

Figure 9 is an enlarged, fragmentary plan view of the mechanism adjacent the connection of the handle with the cart; and Figure 10 is a disassembled view showing the main parts of the mechanism shown in Figure 9.

The cart or carriage 11, illustrated in set-up or unfolded position in Figure 1, and in knock-down or folded position in Figure 2, comprises a frame 12 consisting of a pair of desirably hollow posts 13. These posts are desirably capped at their upper ends and there secured together by a head 14, and at their lower ends connected by a foot device 15. The head comprises a yoke or collar 16 to which a strap (or straps) 17 is secured for holding a golf bag 20 in position. The yoke 16 is desirably secured to the upper ends of the posts 13 by means of bolts (not shown) which pass, not only through it and a clamping plate 18 on the other side of the posts 13, between which the bolts pass, but also hold to said head a fulcrum device 19 which I term a "clock" because it provides for holding the operating handle 21 in desired positions.

This "clock" 19, shown assembled in Figures 1 and 2 and in enlarged detail in Figures 9 and 10, is generally U-shaped in section, that is, it comprises a base or web 22 from which extend a plain or flat flange 23 and a parallel, corrugated or knurled flange 24. Both of these flanges have approximately semi-circular portions beyond the pivot pin 30 on which the handle is pivoted and about which it revolves, said portions being provided with alined approximately semi-circular slots 25. The pin 30 also serves as a pivot for a short external lever 28, which functions as an operating crank. These slots 25 receive a bolt 26 carrying a wing nut 27 for clamping the handle 21 in desired positions between the flanges 23 and 24, and that part of the handle which engages the corrugated flange 24 is provided with complementary corrugations or ribs 24' to firmly mesh therewith. The bolt 26 passes through the outer end of the lever 28 which serves for folding and unfolding the cart, as well as allowing for idler movement of the handle for height adjustment.

The foot device 15 of the cart comprises a yoke portion 29 adapted to embrace the lower portion of a golf bag and to which a strap (or straps) 31 is secured for holding the bag in position. The bag 20 rests on a lower extension 32 desirably formed with a preferably corrugated plate to underlie the bottom of the bag. Such foot device is secured to the lower ends of the posts 13 by means of bolts 33 which pass through it and a retainer plate 34 on the opposite side of said posts.

The cart rides on two preferably plate-type rubber-tired wheels 35, desirably carried by means of ball bearings on stud shafts 36. Each stub shaft 36 is desirably secured between a pair of yokes 37, each of which may be formed by riveting together a pair of plates to provide bifurcations 38. Between each of the bifurcations fits the lower end of one of two pairs of parallel links 39, of uniform length and individually pivotally connected to said yokes by means of rivets 41, thereby forming a wheel-supporting arm at each side of the cart. The spacing of the rivets 41 on one side corresponds with that on the other. Each of these links is formed as a bell-crank lever, as by having an angular head 42, which may be integral therewith, but is desirably formed as a separate metal plate secured thereto, as by means of rivets 43 and 44. The rivets 43 serve for pivoting the bell-crank levers to a fulcrum plate, or sheet 45 (see Figures 4 and 7) and the spacing of the rivets 43 on the right side corresponds with the spacing of those on the left and to the spacing between the pairs of rivets 41 on the yoke 37.

As shown in Figures 7 and 8, the fulcrum sheet 45 desirably is secured to intermediate portions of the posts 13 by means of one or more bolts 46 which pass through it and a clamping plate 47 disposed on the opposite side of said posts. Each head 42 has a portion flaring toward the head of the opposite link, offset with respect thereto, and overlapping therewith. Thus, the heads on the left side may have their widened portions offset outwardly and those on the right side have such portions correspondingly offset inwardly so as to engagingly overlap with one another. This, as will be seen from Figures 3 to 6, inclusive, provides two pairs of bell-crank levers, one pair above the other, and with their upper arms generally horizontal when the parts are in closed or collapsed position, as viewed in Figure 3, and generally extending diagonally downward and inward toward one another when the parts are in open or set-up position, as viewed in Figures 4, 5 and 6.

In order to effect the desired movement of the links or bell-crank levers 39, there is provided a flat actuating rod 48. The upper end of this rod 48 has an angular extension 49, secured thereto as by means of rivets 51. The upper end of the extension 49 is pivoted to the lever 28, as indicated at 50 in Figures 9 and 10 so as to be reciprocated as the handle 21 is oscillated in a vertical plane. The lower portion of this actuating rod is provided with a series of pins 52, 53, 54 and 55, desirably formed as the shank portions of rivets which secure the actuating rod 48 to an outer or cover plate 56, shown in Figures 1 and 2, but removed in Figures 3 to 6, inclusive, so as to illustrate the underlying mechanism.

The pins 52 and 54, I term "locking" pins, as they fit in corresponding notches 57 in the heads 42 for locking them in the position illustrated in Figures 1, 5 and 6 where the wheels are held in separated or operative position, while allowing vertical adjustment of the handle 21 without changing the wheel position. I term the pins 53 and 55 "actuating" pins because they are received in angular slots 58, as distinguished from mere notches, in the heads 42. For the purpose desired, each slot has an upper portion 59 which is generally horizontal when the wheels are collapsed or brought together as shown in Figures 2 and 3, and a portion 61 extending diagonally outward and downward, and which lies parallel to the axes of the posts 13 when the wheels are separated to operative position, as in Figures 1, 5 and 6.

By virtue of the foregoing construction, the parts may be moved from the position illustrated in Figure 1 to that of Figure 2, by grasping the rubber handgrip 62 and moving the handle 21 from the position of Figure 1 down to the position of Figure 2, after tilting the cart to pivot it about the foot device 15 so that the wheels are lifted off the ground, to thereby prevent interference with wheel movement toward one another. Opening or setting-up the cart is effected by moving the handle 21 up from the position of Figure 2 to that of Figure 1, while the wheels are held off the ground as in the preceding instance.

The exact method of operation will be clear from a consideration of Figures 3 to 6, inclusive. Starting with the parts in the collapsed position of Figure 3, movement of the operating rod 48 downward, or in the direction of the arrow by (raising the handle 21), first to that shown in Figure 4, spreads the outer or long arms of the bell-crank levers 39. This is effected by the pins 53 and 55 pushing downward on the heads 42 along the portions defining the lower sides of the upper slot segments 59, while said pins are causing the bell-crank levers or links 39 to open. When the position of Figure 5 is reached, the pins 53 and 55 lie at the intersection between the segments 59 and 61 of the slots. Further movement of the actuating rod 48 carries the pins 53 and 55 to a desired adjusted position in the slot segments 61, as well as moving the locking pins 52 and 54 to corresponding positions in the notches 57. It will be seen that these locking pins 52 and 54 did not start to enter the notches until the parts had moved to the position of Figure 4, the entry thereafter being gradual, through the position of Figure 5, until the bottoms of the notches were reached in Figure 6. It is here emphasized that the downward movement of the rod 48, from the position illustrated in Figure 3, causes an outward, parallel spreading of the wheels to a maximum distance as shown in Figure 5. From this point, a further downward movement of the rod 48 does not result in a further wheel displacement. Consequently, the range of vertical movement of the locking pins 52 and 54 between the limits shown in Figures 5 and 6 is termed an idler movement. Such idler movement affords a convenient means for adjusting the position of the handle 21, Figure 1, to suit the user. It may here be pointed out that such handle adjustment is desirable not only to adapt the cart to the height of the user but also to permit a desired weight-balance since the cart is tilted by means of the handle when wheeled from place to place.

From the foregoing, it will be seen that I have devised a foldable golf bag carrier and support, which upon mere operation of the handle 21, after turning the wing nut 27 to release position, and lifting the wheels off the ground, will move the wheels together or apart while maintaining the wheels in parallel relationship because the links 39 are of equal length and the vertical distance between their upper ends corresponds with that between their lower ends. This movement may be either to a position close together where the handle is folded down over the frame, or to a position spread apart for use and where the handle is positioned at an adjusted elevation, convenient for use by the golfer or his caddy. However, such a device is proposed to obviate the use of a caddy, because it is so readily used and propelled, it serves not only as a transporting device for a golf bag, but also as a stand holding the bag in position for convenient removal or placement of golf clubs.

Having now described my invention in detail in accordance with the requirements of the patent statutes, various changes and modifications will suggest themselves to those skilled in the art. It is intended that such changes and modifications will fall within the scope and spirit of the invention, as defined by the following claims.

I claim:

1. A cart of the kind described comprising a frame on which a load may be carried, a fulcrum plate secured thereto, two pairs of bell-crank levers pivoted one above the other to said plate and each pair having overlapping inner arms overlying said plate, an actuating link for said levers, manually operable means for moving said link, actuating and locking pins outstanding from said actuating link, said overlapping pairs of arms having corresponding slots and notches in which respectively ride said actuating and locking pins, the outer arms of said bell-crank levers normally extending parallel therefrom and diagonally downward on each side of said frame, an axle-mounting yoke pivoted to the ends of each pair of said parallel links, a stub axle extending outwardly from each yoke, and a transport wheel on each axle.

2. A cart of the kind described comprising a frame on which a load may be carried, a fulcrum plate secured thereto, a pair of bell-crank levers pivoted to said plate and having overlapping inner plate arms overlying said plate and increasing in width from their pivots, an actuating link for said levers, manually-operable means for moving said link, an actuating pin and a locking pin thereabove outstanding from said actuating link, said overlapping plate arms having slots in which ride the actuating pin and upwardly opening locking notches thereabove for receiving the locking pin, a second pair of similar bell-crank levers pivoted to said plate below the first pair and having similar overlapping inner plate arms, lower but similar actuating and locking pins outstanding from said actuating link and respectively received in the corresponding slots and notches in said inner plate arms, the outer arms of said bell-crank levers normally extending parallel therefrom and diagonally downward on each side of said frame, an axle-mounting yoke pivoted to the ends of each pair of said parallel arms, a stub axle extending outwardly from each yoke, and a transport wheel on each axle.

3. A cart of the kind described comprising a frame adapted to support a load, a handle pivoted to the upper portion of said frame, a pair of arms pivoted therebeneath to said frame and normally projecting on opposite sides diagonally downward and outward therefrom, a transport wheel carried at the outer end of each of said arms, an actuating link between the pivoted handle and each of said arms, each arm comprising a pair of parallel parts of bell-crank levers, the other part of each bell-crank lever comprising a plate flaring inwardly and overlapping the corresponding inwardly extending arm on the other side, the parallel parts causing the wheels to stay substantially parallel to one another, and the connection between the actuating link and each pair of overlapping bell-crank lever arms involving an actuating pin and a locking pin thereabove outstanding from said actuating link, said overlapping plates having slots in which ride the actuating pins and upwardly opening locking notches thereabove for receiving the locking pins, whereby movement of the handle may, independently of locking-pin action, effect spreading and bringing together of said wheels and, after locking pin-notch engagement, allow adjustment of handle elevation independently of wheel movement.

4. A cart of the kind described including a frame comprising a pair of parallel hollow posts, a head connecting the upper ends of said posts and formed with arms for embracing a golf bag and attachment of a securing strap; a foot device for connecting the lower ends of said posts, supporting said bag, and attachment of a securing strap; a handle pivoted to said head; a fulcrum plate secured to said posts, a pair of arms pivoted to said plate and normally projecting on opposite sides diagonally downward and outward therefrom; a transport wheel carried at the outer end of each of said arms; an actuating link between the pivoted handle and each of said arms, each arm comprising a pair of parallel parts of bell-crank levers, the other part of each bell-crank lever comprising a plate flaring inwardly and overlapping the corresponding inwardly extending arm on the other side, the parallel parts causing the wheels to stay substantially parallel to one another, and the connection between the actuating link and each pair of overlapping bell-crank lever arms involving an actuating pin and a locking pin thereabove outstanding from said actuating link, said overlapping plates having slots in which ride the actuating pins and upwardly opening locking notches thereabove for receiving the locking pins, whereby movement of the handle may, independently of locking pin action, effect spreading and bringing together of said wheels and, after locking pin-notch engagement, allow adjustment of handle elevation independently of wheel movement.

5. A collapsible cart of the kind described comprising a frame on which a load may be carried, a fulcrum plate secured thereto, two pairs of side-by-side bell-crank levers pivoted one above the other to said plate and each pair having overlapping inner plate arms overlying said plate and increasing in width from their pivots, an actuating link for said levers, manually operable means for moving said link, alined actuating and locking pins outstanding from said actuating link, said overlapping pairs of plate arms having corresponding slots and notches in which respectively ride said actuating and locking pins, each slot being angular, so that when the cart is collapsed, its pivot-adjacent part is horizontal and when the cart is set up, its pivot-remote part is vertical, the outer arms of said bell-crank levers normally extending parallel therefrom and diagonally downward on each side of said frame, an axle-mounting yoke pivoted to the ends of each pair of said parallel links, a stub axle extending outwardly from each yoke, and a transport wheel on each axle, whereby movement of the manually-operable means may, independently of locking pin action, effect spreading and bringing together of said wheels and, after locking pin-notch engagement, allow adjustment of the elevation of said manually-operable means independently of wheel movement.

6. A cart of the kind described comprising a frame on which a load may be carried, a fulcrum plate secured thereto, two pairs of links of uniform length pivoted to said plate one above the other at points spaced axially along the frame, a single actuating member for said pairs of links and connected to only the upper end portion of each, manually operable means for moving said member, said links normally extending parallel and diagonally downward on each side of said frame, an axle-mounting yoke pivoted to the ends of each pair of said parallel links, the yoke pivot points being spaced to correspond with the fulcrum plate pivot points, a stub axle extending outwardly from each yoke, and a transport wheel on each axle, whereby the wheels stay parallel as they move toward and away from each other.

7. A cart of the kind described comprising a frame, a handle pivoted to the upper portion of said frame, a pair of arms pivoted therebeneath to said frame and normally projecting on opposite sides diagonally downward and outward therefrom, a transport wheel carried on a yoke at the outer end of each of said arms, an actuating member between the pivoted handle and each of said arms, each arm comprising a pair of bell-crank levers with parallel long arms of equal length and the upper end of each being pivoted to the frame a uniform distance from the other of the pair and having a flaring inwardly-extending arm engagingly overlapping the corresponding inwardly extending arm on the other side, the levers causing the wheels to stay substantially parallel to one another by having their lower ends pivoted to the wheel yokes at points spaced to correspond with the spacing of their upper-pivot points, and the connection between the actuating link and each pair of overlapping bell-crank lever arms involving an actuating pin and a locking pin thereabove outstanding from said actuating link, said overlapping plate arms having slots in which ride the actuating pins and upwardly opening locking notches thereabove for receiving the locking pins, whereby movement of the handle may independently of locking pin action, effect spreading and bringing together of said wheels without change in their parallel relationship and, after locking pin-notch engagement, allow adjustment of handle elevation independently of wheel movement.

References Cited in the file of this patent

UNITED STATES PATENTS

| | | |
|---|---|---|
| 2,577,290 | Underwood | Dec. 4, 1951 |
| 2,597,386 | Schmid | May 20, 1952 |
| 2,626,814 | Chamberlin | Jan. 27, 1953 |
| 2,626,815 | Chamberlin | Jan. 27, 1953 |